United States Patent
Berggren et al.

(10) Patent No.: US 9,912,451 B2
(45) Date of Patent: Mar. 6, 2018

(54) METHODS AND NODES IN A WIRELESS COMMUNICATION SYSTEM

(71) Applicant: Huawei Technologies Co., Ltd., Shenzhen, Guangdong (CN)

(72) Inventors: Fredrik Berggren, Kista (SE); David jean-marie Mazzarese, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 141 days.

(21) Appl. No.: 14/932,759

(22) Filed: Nov. 4, 2015

(65) Prior Publication Data

US 2016/0057742 A1  Feb. 25, 2016

Related U.S. Application Data

(63) Continuation of application No. PCT/EP2013/059659, filed on May 8, 2013.

(51) Int. Cl.
*H04L 5/00* (2006.01)
*H04W 72/04* (2009.01)

(52) U.S. Cl.
CPC .......... *H04L 5/0023* (2013.01); *H04L 5/0048* (2013.01); *H04L 5/0051* (2013.01); *H04W 72/044* (2013.01); *H04W 72/0406* (2013.01)

(58) Field of Classification Search
CPC ........... H04W 72/042; H04W 72/0453; H04W 76/026; H04W 88/02; H04L 5/0053; H04L 5/0051; H04L 5/0023
See application file for complete search history.

(56) References Cited

U.S. PATENT DOCUMENTS

| | | | |
|---|---|---|---|
| 9,253,782 B2 * | 2/2016 | Xu | H04W 72/048 |
| 2012/0207105 A1 * | 8/2012 | Geirhofer | H04L 5/0032 370/329 |
| 2013/0044727 A1 * | 2/2013 | Nory | H04L 5/0092 370/330 |
| 2013/0083769 A1 | 4/2013 | Qu et al. | |
| 2013/0100901 A1 | 4/2013 | Shan et al. | |
| 2016/0057742 A1 * | 2/2016 | Berggren | H04L 5/0048 370/329 |

OTHER PUBLICATIONS

"Reference signals for ePDCCH", Ericsson, ST-Ericsson, 3GPP TSG-RAN WG1 #68bis, Mar. 26-30, 2012, 6 pages, R1-121021.
"DMRS Port Assignment for E-PDCCH", Research in Motion, UK Limited, 3GPP TSG RAN WG1 Meeting #68bis, Mar. 26-30, 2012, 7 pages, R1-121480.

* cited by examiner

*Primary Examiner* — Raj Jain

(57) ABSTRACT

Methods and nodes, using at least one subframe, and at least one set of reference signals selected from a first or second candidate set of reference signals, each set of reference signals comprising a set of antenna ports. The method comprises assigning resource blocks by means of control channel for the data channel in the subframe; associating one set of reference signals, selected from the first or the second candidate set of reference signals with the assigned resource blocks, utilising the set of antenna ports of the selected set of reference signals, based on a set of rules related to at least the assigned resource blocks; and transmitting the data channel on the assigned resource blocks.

23 Claims, 9 Drawing Sheets

METHODS AND NODES IN A WIRELESS COMMUNICATION SYSTEM

CROSS REFERENCE TO RELATED APPLICATIONS

This application is a continuation of International Application No. PCT/EP2013/059659, filed on May 8, 2013, which is incorporated herein by reference in its entirety.

TECHNICAL FIELD

Implementations described herein relate generally to a transmitter and a method in a transmitter, a receiver and a method in a receiver. In particular is herein described a mechanism for transmission of a data channel and a control channel to a receiver.

BACKGROUND

A receiver, also known as User Equipment (UE), mobile station, wireless terminal and/or mobile terminal is enabled to communicate wirelessly in a wireless communication system, sometimes also referred to as a cellular radio system. The communication may be made, e.g., between two receivers, between a receiver and a wire connected telephone and/or between a receiver and a server via a Radio Access Network (RAN) and possibly one or more core networks.

The receiver may further be referred to as mobile telephones, cellular telephones, computer tablets or laptops with wireless capability. The receivers in the present context may be, for example, portable, pocket-storable, hand-held, computer-comprised, or vehicle-mounted mobile devices, enabled to communicate voice and/or data, via the radio access network, with another entity.

The wireless communication system covers a geographical area which is divided into cell areas, with each cell area being served by a transmitter, also referred to as a radio network node or base station, e.g., a Radio Base Station (RBS), "eNB", "eNodeB", "NodeB" or "B node", depending on the technology and terminology used. Sometimes, also the expression cell may be used for denoting the transmitter/radio network node itself. However, the cell is also, or in normal terminology, the geographical area where radio coverage is provided by the transmitter/radio network node at a base station site. One transmitter, situated on the base station site, may serve one or several cells. The transmitters communicate over the air interface operating on radio frequencies with the receivers within range of the respective transmitter.

In some radio access networks, several transmitters may be connected, e.g., by landlines or microwave, to a Radio Network Controller (RNC), e.g., in Universal Mobile Telecommunications System (UMTS). The RNC, also sometimes termed Base Station Controller (BSC), e.g., in GSM, may supervise and coordinate various activities of the plural transmitters connected thereto. GSM is an abbreviation for Global System for Mobile Communications (originally: Groupe Spécial Mobile). In 3rd Generation Partnership Project (3GPP) Long Term Evolution (LTE), transmitters, which may be referred to as eNodeBs or eNBs, may be connected to a gateway, e.g., a radio access gateway, to one or more core networks.

In the present context, the expressions downlink, downstream link or forward link may be used for the transmission path from the transmitter to the receiver. The expression uplink, upstream link or reverse link may be used for the transmission path in the opposite direction, i.e., from the receiver to the transmitter.

In order to enable coherent demodulation of data, the transmitter has to send a pre-defined reference signal, or pilot signal as it also may be referred to as, to the receiver/UE. The reference signal may not encode any information and it is typically known to the receiver. From the reference signal, using a priori information on its modulation symbols and time-frequency location, the receiver may, based on the received reference signal, obtain channel estimates such as, e.g., the phase and amplitude of the channel frequency response, which are used for channel equalization prior to the demodulation.

In the prior art 3GPP LTE system, multiple transmit and receive antennas are supported and the notion of antenna port is used. Each downlink antenna port is associated with a unique reference signal. An antenna port may not necessarily correspond to a physical antenna and one antenna port may be mapped to more than one physical antenna. In any case, the reference signal may be used for channel estimation for data that is transmitted on the same antenna port. Channel estimation therefore needs to be performed for all antenna ports that are used for the data transmission. A number of reference signals have been defined in the LTE downlink, e.g., Common Reference Signal (CRS).

CRS is a cell-specific reference signal, which is transmitted in all subframes and in all Resource Blocks (RBs) of the carrier. The CRS serves, among several purposes, as a reference signal for phase and amplitude reference for coherent demodulation, i.e., to be used in channel estimation. Up to 4 antenna ports (labelled 0-3) may be accommodated with the CRS. These antenna ports are multiplexed on orthogonal time-frequency resources, i.e., disjoint sets of Resource Elements (REs). The CRS may offer robustness as it supports transmit diversity based PDSCH transmission.

The RE is the smallest time-frequency entity that can be used for transmission in LTE, and may convey a complex-valued modulation symbol on a subcarrier. In this context, the RE may be referred to as a time-frequency resource. The RB comprises a set of REs or a set of time-frequency resources and is of 0.5 ms duration (e.g., 7 Orthogonal Frequency-Division Multiplexing (OFDM) symbols) and 180 kHz bandwidth (e.g., 12 subcarriers with 15 kHz spacing). The LTE standard refers to a Physical Resource Block (PRB) as a RB where the set of OFDM symbols in the time-domain and the set of subcarriers in the frequency domain are contiguous.

With multiple antennas, it is possible to achieve beamforming by applying different complex-valued weights on the different antenna ports, also referred to as precoding. However, since the CRS is cell-specific, it cannot be receiver-specifically precoded, i.e., it cannot achieve any beamforming gains although the user data channel may undergo beamforming since it is not cell-specific. Therefore, typically the precoder used for the data channel has to be signalled to the receiver.

Another defined reference signal is the Demodulation Reference Signal (DM-RS). This is a receiver-specific reference signal and it is only transmitted in the resource blocks and subframes where the receiver has been scheduled data i.e., containing the Physical Downlink Shared Channel (PDSCH). Up to 8 antenna ports may be accommodated by the DM-RS. The antenna ports (labelled 7-14) are multiplexed both in frequency and by orthogonal cover codes in time. Since it is receiver-specific, the DM-RS may be precoded with the same precoder used for the PDSCH, hence beamforming gains may be achieved for the reference signal. Since both data channel and the DM-RS use the same precoder, the precoding becomes transparent to the receiver. Thus there is no need to signal the precoder to the receiver as it can be regarded as part of the channel, which is estimated by the DM-RS.

In order to receive the PDSCH, the receiver is monitoring a set of time-frequency resources i.e., Control Channel Elements (CCEs) or Enhanced CCEs (ECCEs) in a downlink control channel such as e.g., PDCCH or EPDCCH and performs blind decoding to detect Downlink Control Information (DCI) associated with the PDSCH transmission. The receiver is configured in one of several transmission modes wherein it is monitoring one DCI format (e.g., DCI format 1A) which typically may be used when a robust transmission of the PDSCH is needed, e.g., using transmit diversity. DCI format 1A schedules the PDSCH on antenna port 0, or 0, 1 or 0, 1, 2, 3, with the exception in MBSFN subframes where antenna port 7 is used. In addition, the receiver monitors one additional DCI format, which may utilise DM-RS for PDSCH demodulation. This additional DCI format can typically accommodate much more advanced transmission schemes such as Single User MIMO (SU-MIMO) or Multi User MIMO (MU-MIMO) or CoMP transmission.

The antenna port to be assumed by the receiver, based on CRS or DM-RS, for demodulating the PDSCH is determined from the detected associated DCI format depending on the configured transmission mode. In some cases, the DCI format itself may also contain additional bits related to which of the DM-RS antenna ports (e.g., port 7 or 8) that should be used. This is, e.g., applicable when MU-MIMO is used. The prior art LTE system does not provide any dynamic switching between using cell-specific reference signals or receiver-specific reference signals.

In order to improve the spectral efficiency of the 3GPP LTE system, it has been considered to define a new carrier type which only transmits the CRS in a subset of the subframes in a radio frame and possibly also in a subset of the resource blocks of the carrier. A further overhead reduction could also be envisaged by only utilising one CRS, i.e., antenna port 0. This reduced CRS would not be used for channel estimation but only for time- and frequency synchronization and measurements. PDSCH demodulation would thus primarily be based on the DM-RS.

FIG. 1 shows a non-limiting example of a subframe for a carrier with 14 resource blocks where a cell-specific reference signal is transmitted in resource block 2-11, which may in other examples occupy all resource blocks (e.g. 0-13). User-specific reference signals may in this example be transmitted in resource block 0, 1, 2, 3, 10, 11, 12 and 13.

However, in the prior art LTE system, the user-specific reference signals may comprise time-frequency resource elements (REs) overlapping with the synchronization signals or the broadcast channel. This implies that DM-RS based PDSCH transmission cannot be accommodated in such resource blocks. The six central resource blocks may, depending on subframe number, contain synchronization signals and a broadcast channel. In one example the reduced CRS would be transmitted in subframes where DM-RS overlaps with at least a synchronization signal. In other subframes, where synchronization signals and/or broadcast channels are not transmitted the reduced CRS may not even be present at all and the DM-RS may be utilised in all resource blocks. Thereby, subframes wherein all transmissions are based on the DM-RS would occur. There would therefore necessarily have to be a DCI format (similar to DCI format 1A) which schedules the PDCSH on DM-RS ports only.

A system is considered wherein, for at least one subframe, a user-specific reference signal can be transmitted only in a subset resource blocks. The system further includes a cell-specific reference signal which is applicable for channel estimation for data channel demodulation. The data channel may thus be transmitted either by the user-specific reference signal or the cell-specific reference signal.

A first problem comprises determining which reference signal (antenna port) that should be utilised.

A second problem comprises determining which resource blocks of a data channel assignment that should be used.

In the prior art LTE system, DM-RS based PDSCH transmission is not supported in resource blocks where the DM-RS would overlap with a synchronization signal or a broadcast channel. CRS-based PDSCH transmission is supported in all resource blocks. The designated antenna port is given by the configured transmission mode, subframe type (i.e., normal subframe or MBSFN subframe) and, for some instances of DM-RS, additionally with explicit bits in the corresponding DCI format.

In the prior art LTE system, both CRS and DM-RS can be transmitted, which leads to high reference signal overhead, decreased throughput and reduced overall system efficiency. It is a further objective to maximize the flexibility for the system to select a suitable reference signal (antenna port) for a given transmission while at the same time not requiring overhead signalling for informing the receiver about the selected antenna port.

Hence, it is a problem to assure that there is a reasonable trade-off between reference signal overhead and performance.

SUMMARY

It is therefore an object to obviate at least some of the above mentioned disadvantages and to improve the performance in a wireless communication system.

According to a first aspect, the object is achieved by a method in a transmitter. The method aims at transmitting a data channel to a receiver, using at least one subframe, and at least one set of reference signals which is selected from a first candidate set of reference signals, or from a second candidate set of reference signals. Each set of reference signals comprising a set of antenna ports. The method comprises assigning resource blocks by means of a control channel for the data channel in the at least one subframe. Also, the method comprises associating one set of reference signals, selected from the first or the second candidate set of reference signals with the assigned resource blocks, utilising the set of antenna ports of the selected set of reference signals, based on a set of rules related to at least the assigned resource blocks for the data channel. In addition, the method furthermore comprises transmitting the data channel on the assigned resource blocks.

According to a second aspect, the object is achieved by a transmitter. The transmitter is configured for transmission of a data channel to a receiver, using at least one subframe, and at least one set of reference signals which is selected from a first candidate set of reference signals, or from a second candidate set of reference signals. Each set of reference signals comprises a set of antenna ports. The transmitter comprises a processing circuit. The processing circuit is configured for assigning resource blocks by means of a control channel for the data channel in the at least one subframe. Further, the processing circuit is additionally configured for associating one set of reference signals, selected from the first or the second candidate set of reference signals with the assigned resource blocks, utilising the set of antenna ports of the selected set of reference signals, based on a set of rules related to at least the assigned resource blocks for the data channel. The transmitter also comprises a transmitting unit, configured for transmitting the data channel on the assigned resource blocks.

According to a third aspect, the object is achieved by a method in a receiver. The method comprises reception of a data channel and a control channel using at least one subframe, and at least one set of reference signals which is selected from a first candidate set of reference signals, or from a second candidate set of reference signals. Each set of reference signals comprises a set of antenna ports. The method comprises receiving the data channel and the control channel comprising reference signals associated with resource blocks in the data channel. Also, the method comprises selecting one set of reference signals, from the first or the second candidate set of reference signals to be utilised for retrieving data on the data channel, based on a predetermined set of rules. In addition, the method further comprises retrieving data on the data channel by using the selected set of reference signals.

According to a fourth aspect, the object is achieved by a receiver. The receiver is configured for reception of a data channel and a control channel using at least one subframe, and at least one set of reference signals which is selected from a first candidate set of reference signals, or from a second candidate set of reference signals. Each set of reference signals comprises a set of antenna ports. The receiver comprises a receiving unit. The receiving unit is configured for receiving the data channel and the control channel comprising reference signals associated with resource blocks in the data channel. Further, the receiver comprises a processing circuit. The processing circuit is configured for selecting one set of reference signals, from the first or the second candidate set of reference signals to be utilised for retrieving data on the data channel, based on a pre-determined set of rules. In further addition, the processing circuit is also configured for retrieving data on the data channel by using the selected set of reference signals.

Some advantages according to embodiments herein comprise that the data channel only is transmitted in resource blocks of the assignment, for which the determined reference signal may be utilised. Thereby, an improved performance and spectral utilisation within the wireless communication system is provided.

Other objects, advantages and novel features of the embodiments of the invention will become apparent from the following detailed description.

BRIEF DESCRIPTION OF THE DRAWINGS

Embodiments of the invention are described in more detail with reference to attached drawings illustrating examples of embodiments in which.

DETAILED DESCRIPTION

Embodiments of the invention described herein are defined as a transmitter and a method in a transmitter, a receiver and a method in a receiver, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
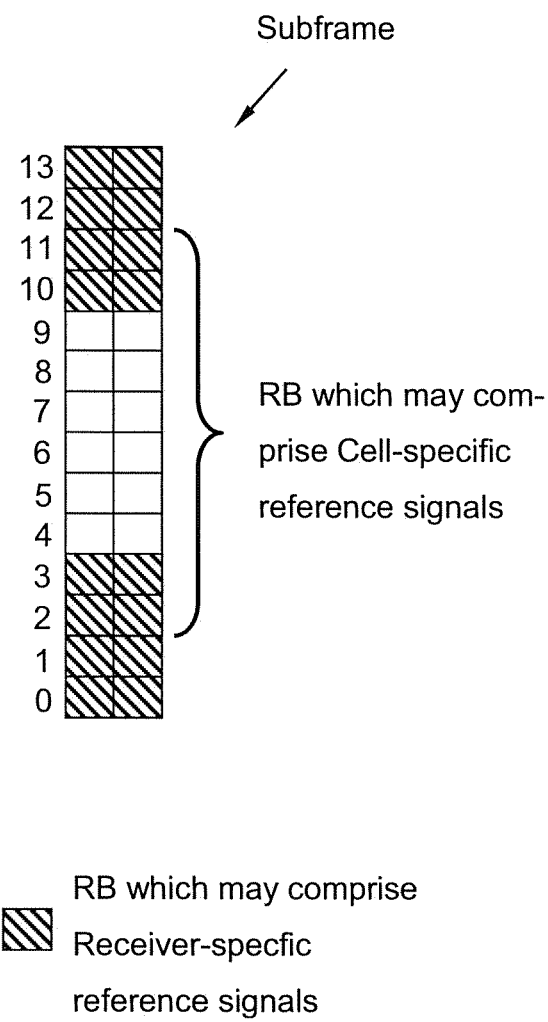
FIG. 1 is a block diagram illustrating a subframe for a carrier with 14 resource blocks, according to prior art.
Figure 2:
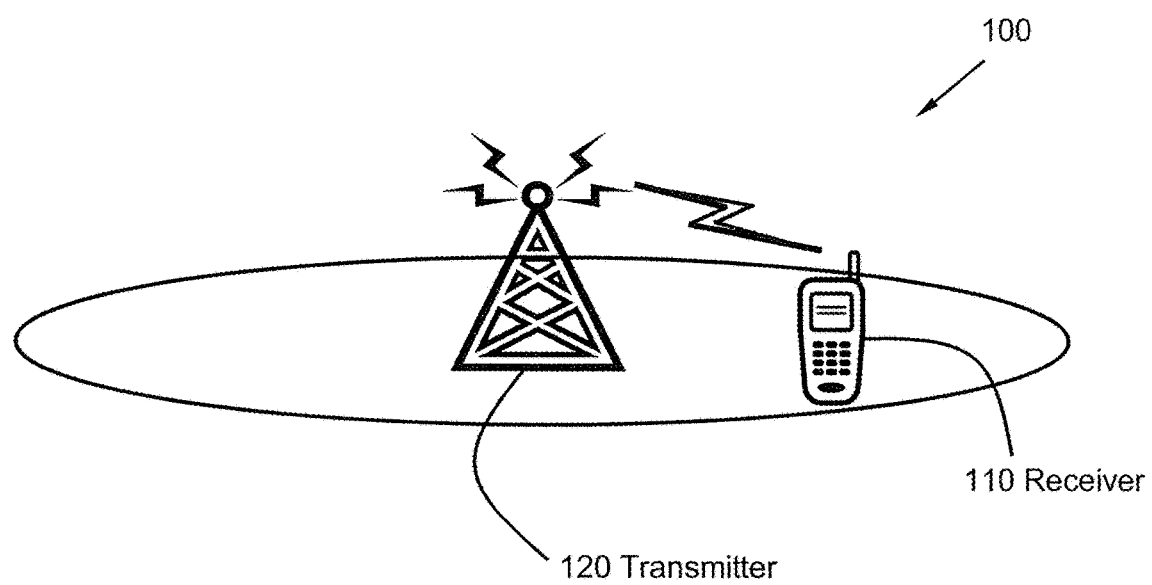
FIG. 2 is a block diagram illustrating a wireless communication system.

FIG. 2 is a schematic illustration over a wireless communication system 100. The wireless communication system 100 may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Spécial Mobile) (GSM)/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1×RTT and High Rate Packet Data (HRPD), just to mention some few options.

The wireless communication system 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a Guard Period situated in the time domain between the uplink and downlink signalling. FDD means that the transmitter and receiver operate at different carrier frequencies, as have previously been discussed.

The purpose of the illustration in FIG. 2 is to provide a simplified, general overview of the methods and nodes, such as transmitter and receiver herein described, and the functionalities involved. The method, transmitter and receiver will subsequently, as a non-limiting example, be described in a 3GPP/LTE environment, but the embodiments of the disclosed method, transmitter and receiver may operate in a wireless communication system 100 based on another access technology such as, e.g., any of the above enumerated. Thus, although the embodiments of the invention are described based on, and using the lingo of, 3GPP LTE systems, it is by no means limited to 3GPP LTE.

The illustrated wireless communication system 100 comprises a receiver 110 and a transmitter 120, which is serving a cell.

The transmitter 120 controls the radio resource management within the cell, such as, e.g., allocating radio resources to the receiver 110 within the cell and ensuring reliable wireless communication between the transmitter 120 and the receiver 110. The transmitter 120 may typically comprise an eNodeB, e.g., in an LTE-related wireless communication system 100.

The receiver 110 is configured to receive radio signals comprising information transmitted by the transmitter 120. However, the receiver 110 is also configured to transmit radio signals comprising information to be received by the transmitter 120.

It is to be noted that the illustrated network setting of one receiver 110 and one transmitter 120 in FIG. 2 is to be regarded as a non-limiting example of an embodiment only. The wireless communication system 100 may comprise any other number and/or combination of transmitters 120 and/or receivers 110, although only one instance of a receiver 110 and a transmitter 120, respectively, are illustrated in FIG. 2, for clarity reasons. A plurality of receivers 110 and transmitters 120 may further be involved in some embodiments of the disclosed invention.

Thus whenever "one" or "a/an" receiver 110 and/or transmitter 120 is referred to in the present context, a plurality of receivers 110 and/or transmitters 120 may be involved, according to some embodiments.

The receiver 110 may be represented by, e.g., a UE, a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the transmitter 120, according to different embodiments and different vocabulary.

The transmitter 120 may according to some embodiments be referred to as, e.g., radio network nodes, base stations, NodeBs, evolved Node Bs (eNBs, or eNode Bs), base transceiver stations, Access Point Base Stations, base station routers, Radio Base Stations (RBSs), macro base stations, micro base stations, pico base stations, femto base stations, Home eNodeBs, sensors, beacon devices, relay nodes repeaters or any other network nodes configured for communication with the receiver 110 over a wireless interface, depending, e.g., of the radio access technology and terminology used.

Embodiments of the invention herein disclose DM-RS which provides flexibility due to that it can be precoded together with the PDSCH. It is also a fundamental feature of certain operations such as Multi-User Multiple Input Multiple Output (MU-MIMO) and Coordinated MultiPoint (CoMP). In comparison to using one single layer transmission with one CRS port, performance may be more robust by DM-RS since it contains more reference symbols per resource block. The robustness may also be improved by that the DM-RS allows for transparent use of different precoders in different resource blocks, i.e., random precoding.

It would therefore be beneficial to allow DM-RS based transmissions in any subframe. On the other hand, there might be resource blocks in which the DM-RS cannot be transmitted, requiring CRS based transmission. It is therefore a problem to determine which antenna ports, i.e., CRS or DM-RS based that should be utilised for a given PDSCH transmission.

Some embodiments of the invention disclose the determination of the antenna port, i.e., reference signal of PDSCH demodulation implicitly from any of the time-frequency resources such as, e.g., resource blocks assigned for the PDSCH, in at least one subframe in a radio frame. This is advantageous as it requires no additional signalling to indicate the reference signal. It further makes it possible to utilise a same DCI format for either CRS-based or DM-RS-based PDSCH transmission, thereby not requiring any increase of blind decoding of the downlink control channel. Blind decoding typically increases the energy consumption in the receiver 110. Furthermore, an advantage of determining the antenna port implicitly is that no corresponding explicit bits are needed in the DCI format, which would increase the coding rate and thereby increase the error probability for detecting the control channel. One way to realize the invention is that, for example, DCI format 1A, or an enhanced version of it, could schedule the PDSCH with CRS on the six central resource blocks or by the DM-RS on the remaining resource blocks in the carrier. Thus by enabling a single DCI format to select antenna ports for the data channel to be either cell-specific reference signals or receiver-specific reference signals, maximum flexibility is achieved for the transmitter 120. Thus all resource blocks may become utilised in the carrier, by a single DCI format, which improves the spectral efficiency of the system 100.

Furthermore, in order to maximize the flexibility in using the control channels in the system 100, multiple control channels may be transmitted within a subframe, e.g., the PDCCH or the EPDCCH. Similarly as for associating certain resource blocks with antenna ports for the data channel, predefined rules could be applied in order to determine which control channel should be detected, wherein different control channels are associated with different sets of reference signals. A control channel defines at least one search space, which includes time-frequency positions on which the receiver 110 should blindly decode the control channel. It is realized that the position of the control channel candidates can be associated with different reference signals. Thereby, the position of a control channel candidate may determine which of the control channels that transmitted the control channel candidate.

Figure 3A:
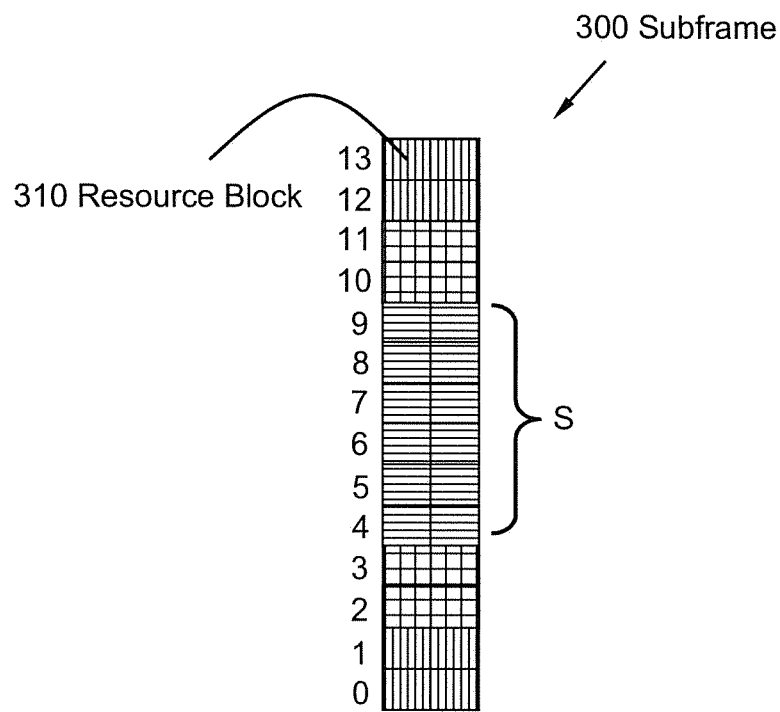
FIG. 3A is a block diagram illustrating a subframe for a carrier with 14 resource blocks according to an embodiment of the invention.

FIG. 3A illustrates an embodiment of a subframe 300 comprising 14 resource blocks 310.

In one embodiment, a set S of resource blocks 310 is defined, which is known both to the receiver 110 and the transmitter 120. A set of antenna ports is associated with the set S of resource blocks 310. For example, the set S may comprise the 6 central resource blocks 310 as illustrated in FIG. 3, and the antenna ports may be those of a cell-specific reference signal such as a reduced CRS. The set may thus be predefined and requiring no signalling between the transmitter 120 and the receiver 110. Additionally, some embodiments of the invention also applies to cases where the set S is signalled from the transmitter 120 to the receiver 110, e.g., by RRC signalling, MAC signalling or by signals in the physical layer. A skilled reader realises that the different subframes 300 may relate to different sets S and may modify the notation accordingly.

In one embodiment, one or several selection rules are defined for PDSCH assignments which comprise at least one resource block 310 of set S. For example such rules may comprise at least one of the following, or any combination, such that a first set of reference signals, which may comprise cell-specific reference signals or receiver-specific reference signals in different embodiments may be utilised if at least one of the following statements is true:

All resource blocks 310 of the assigned PDSCH are within the defined set S.

At least K>0 resource blocks 310 of the assigned PDSCH are within the defined set S, where K is a threshold value.

The lowest indexed resource block 310 of the assigned PDSCH is within the defined set S.

The largest indexed resource block 310 of the assigned PDSCH is within the defined set S.

Otherwise, if none of the above enumerated statements is true, a second candidate set of reference signals may be utilised, which may comprise receiver-specific reference signals.

Further, the set S may be empty in certain subframes 300 in some embodiments.

FIG. 3A illustrates an embodiment of a subframe 300 comprising 14 resource blocks 310. An example of the embodiment is where all the assigned resource blocks for the data channel are confined to any of resource block 4, 5, 6, 7, 8 and 9, for which a cell-specific reference signal should be utilised. Otherwise, a receiver-specific reference signal is used if the assigned resource blocks for the data channel include resource block 0, 1, 2, 3, 10, 11, 12 and 13.

In a second embodiment, for control channels, the receiver 110 may determine the antenna port used for demodulation of the control channel, where cell-specific antenna ports are associated with the PDCCH, and receiver-specific antenna ports are associated with the EPDCCH. When the receiver 110 attempts blind detection of a certain control channel, the receiver 110 may attempt to detect PDCCH if:

All resource blocks 310 comprising the control channel candidate are within the defined set S.

At least K>0 resource blocks 310 comprising the control channel candidate are within the defined set S, where K is a threshold value.

The lowest indexed resource block 310 comprising the control channel candidate is within the defined set S.

The largest indexed resource block 310 comprising the control channel candidate is within the defined set S.

In all other cases, the receiver 110 may attempt to detect the EPDCCH in the configured EPDCCH Physical RB (PRB) sets, if at least one such EPDCCH PRB set is configured. The set S may be empty in certain subframes 300, for which the receiver 110 may attempt to detect the EPDCCH in the configured EPDCCH Physical RB (PRB) sets, if at least one such EPDCCH PRB set is configured. The associated antenna port for the scheduled PDSCH may be determined according to the first embodiment or may, at least when the set S is non-empty, be restricted to be the same as for the detected downlink control channel.

In a further embodiment, the receiver 110 may attempt to detect the PDCCH on all resource blocks 310 of the system, if the set S is non-empty in the given subframe 300. The associated antenna port for the scheduled PDSCH may be determined according to the first embodiment.

In one embodiment, the transmission of PDCCH is limited to PRBs in set S, where set S spans the 6 central PRBs. If the carrier comprises B>|S| PRBs (where |.| denotes the cardinality of a set), according to one option, the PDCCH may be arranged assuming a carrier bandwidth corresponding to B PRBs, while puncturing (i.e., not utilising) any PDCCH time-frequency resources outside the set S. In another option, the PDCCH may be arranged assuming a carrier bandwidth corresponding to |S| PRBs (e.g., |S|=6 and B>6) and the PDCCH is transmitted on time-frequency resources located within the set S.

Figure 3B:
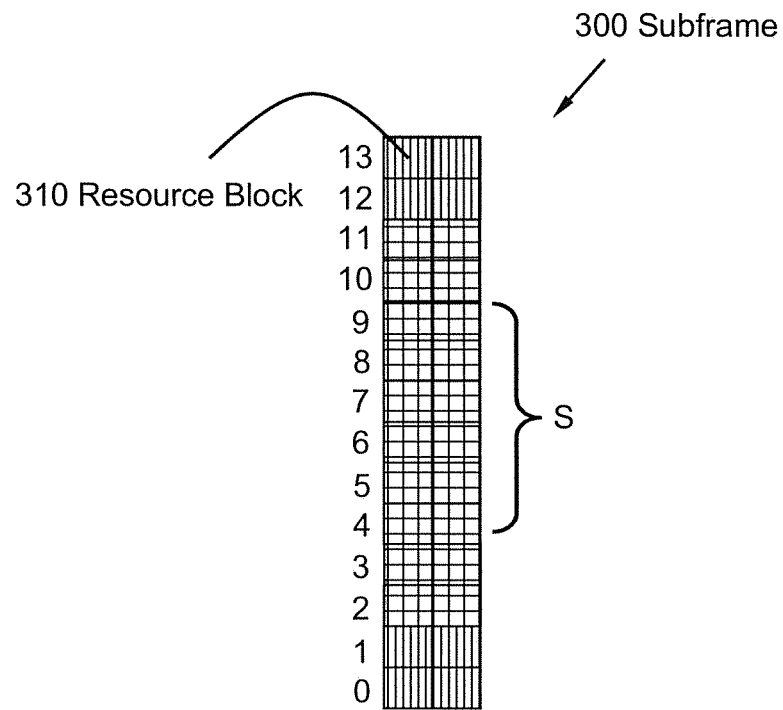
FIG. 3B is a block diagram illustrating a subframe for a carrier with 14 resource blocks according to an embodiment of the invention.

FIG. 3B illustrates an embodiment of a subframe 300 comprising 14 resource blocks 310.

In the illustrated embodiment, the set S span 6 central resource blocks 310, which may comprise both Receiver-specific reference signals and Cell-specific reference signals. In some embodiments, the Receiver-specific reference signals may comprise punctured Demodulation Reference Signal, DM-RS. A punctured DM-RS signal is characterised by that some of its resource elements are not utilised for the reference signal, e.g., as a consequence of overlapping with resource elements from another channel or signal.

Thus resource blocks 310 comprised in the set S may be associated with a punctured DM-RS, while resource blocks 310 outside set S may be associated with a non-punctured DM-RS in some embodiments. The punctured DM-RS may be used for the assigned resource blocks 310 according to any, some or all of the above enumerated rules. However, the set S may further comprise a cell-specific signal, e.g., a reduced CRS, which may additionally be transmitted for other purposes than to serve as a reference for demodulation in some embodiments.

Figure 4:
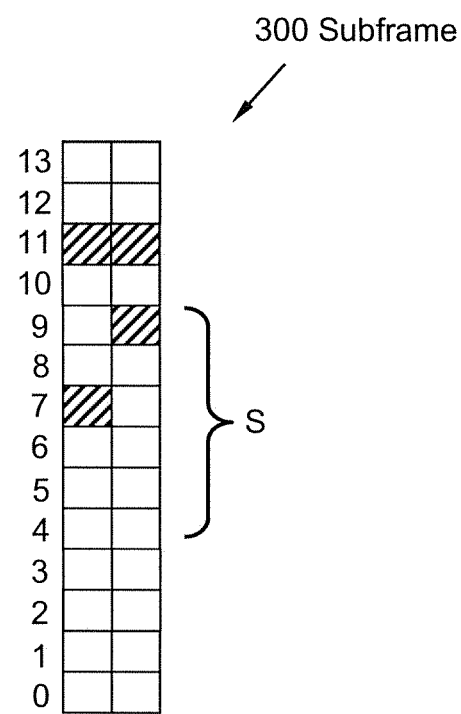
FIG. 4 is a block diagram illustrating a subframe for a carrier with 14 resource blocks according to an embodiment of the invention.

FIG. 4 illustrates an example of a subframe 300 comprising 14 resource blocks 310. A set S of resource blocks 310 is defined, comprising the 6 central resource blocks 310 as illustrated.

A detection of two resource blocks 310 comprising control channel candidates within the set S and one resource block 310 comprising control channel candidates outside the set S has been made. This may be made by applying the rule: the receiver 110 is to detect PDCCH on the resource blocks 310 comprising the control channel candidate within the defined set S.

Further, some embodiments may comprise Semi-Persistent Scheduling (SPS) and/or multi-subframe scheduling.

In the prior art LTE system, SPS may be utilised on primary serving cells. That is, a control channel schedules the PDSCH in one subframe and reserves time-frequency resource in additional subframes such that the PDSCH may subsequently be transmitted without any associated downlink control channel. Some embodiments of the invention may apply to SPS in at least two ways.

According to some embodiments, different antenna ports may be utilised for the PDSCH in different subframes 300. For example if the PDSCH comprises resource blocks 310 within the set S, cell-specific antenna ports may be utilised. On the other hand, if the set S is empty in a subframe 300, receiver-specific reference signals may be utilised.

According to yet some embodiments, the same set of antenna ports may be utilised for the PDSCH as in the subframe 300 containing the first PDSCH assignment in the SPS transmission.

This may be achieved by restricting the SPS periodicity to coincide with the subframe periodicity of transmission of the cell-specific reference signal. The current set of SPS periodicities are 10, 20, 32, 40, 64, 80, 128, 160, 320 and 640 subframes 300. One possible case may be where the cell-specific reference signal is transmitted periodically such as e.g., every N:th subframe 300, where N is an arbitrary positive integer. Thus the set S may be non-empty every N:th subframe 300. For example, when the subframe periodicity of transmission of the cell-specific reference signal is 5 subframes, the set of SPS periodicities may be selected by rounding any value to the closest multiple of 5. For example 32 may be rounded to 30, etc. Furthermore, such form of restriction of SPS periodicities may apply also to other forms of cell-specific reference signal schedules. For example, if it is transmitted in consecutive subframes e.g., subframe 0, 1, 5 and 6 with a certain period.

Multi-subframe scheduling implies that the PDSCH may be transmitted in multiple subframes 300 by a single downlink control channel in one subframe 300. Some embodiments of the invention may apply to multi-subframe scheduling in at least two ways:

Different antenna ports may according to some embodiments be utilised for the PDSCH in different subframes 300. This may occur when the set S is different in the scheduled subframes 300. For example when the PDSCH comprises resource blocks 310 within the set S, cell-specific antenna ports may be utilised. On the other hand, when the set S is empty in a subframe 300, receiver-specific reference signals may be utilised.

However, according to some embodiments, the same antenna ports may be utilised for the PDSCH in different subframes 300. This may occur when the PDSCH is either scheduled on resource blocks 310 within the set S, or is not scheduled on resource blocks 310 within set S, in all subframes 300.

The prior art LTE system contains a number of different methods for allocating the resource blocks 310 for the PDSCH. In one resource allocation type, Resource Block Groups (RBGs) may be assigned, where the RBG comprises a set of contiguous resource blocks 310. Thus the resource assignment granularity is in terms of groups of multiple consecutive resource blocks, if the RBG size is larger than a single resource block. In an illustrative example, an RBG may contain resource blocks 310 both from the set S and from outside the set S as illustrated in FIG. 4. Suppose the set S is associated with a cell-specific reference signal and a receiver-specific reference signal is associated with resource blocks located outside set S. For example, such an RBG may contain resource block 3 and 4. However, since the DM-RS is not present in resource block 4, this RBG may not be utilised for DM-RS based PDSCH transmission. Hence, this RBG may according to prior art methods in a LTE system not be scheduled at all and be left completely empty. This is an issue as it reduces the spectral efficiency of the system in the prior art.

In one embodiment, for a given PDSCH assignment, the antenna port may firstly be determined according to the embodiments of the invention. Secondly, the PDSCH may only be mapped to and transmitted on the resource blocks 310 which actually can utilise the determined antenna port.

For example, the REG containing resource block 3 and 4 can be utilised for DM-RS based PDCSH transmission by not transmitting the PDSCH on resource block 4. Hence, only resource block 4 is left empty. Alternatively, if the rules of previous embodiment would have resulted in that the cell-specific reference signal should be used, resource block 3 and 4 can be utilised for CRS based PDCSH transmission by not transmitting the PDSCH on resource block 3. Hence, only resource block 3 is left empty. Such resource mapping may be made without requiring any additional signalling between the transmitter 120 and the receiver 110. Thereby, by implicit messaging due to the mutual set of rules, no additional messaging between the transmitter 120 and the receiver 110 has to be made.

Furthermore, some embodiments of the invention may be applicable to a multi-carrier system such as e.g. OFDM or DFTS-OFDM. It may be applicable both with and without carrier aggregation in different embodiments. It may further be applicable to carriers that may be deployed as stand-alone or to carriers that can only function with carrier aggregation.

A receiver 110 may be allowed to use different types of reference signals for demodulation of a single PDSCH assignment, where different types of reference signals are used in different resource blocks 310. However, this may increase the implementation complexity at the receiver 110 since the receiver 110 may require implementing multiple types of channel estimators for the same PDSCH.

Figure 5:
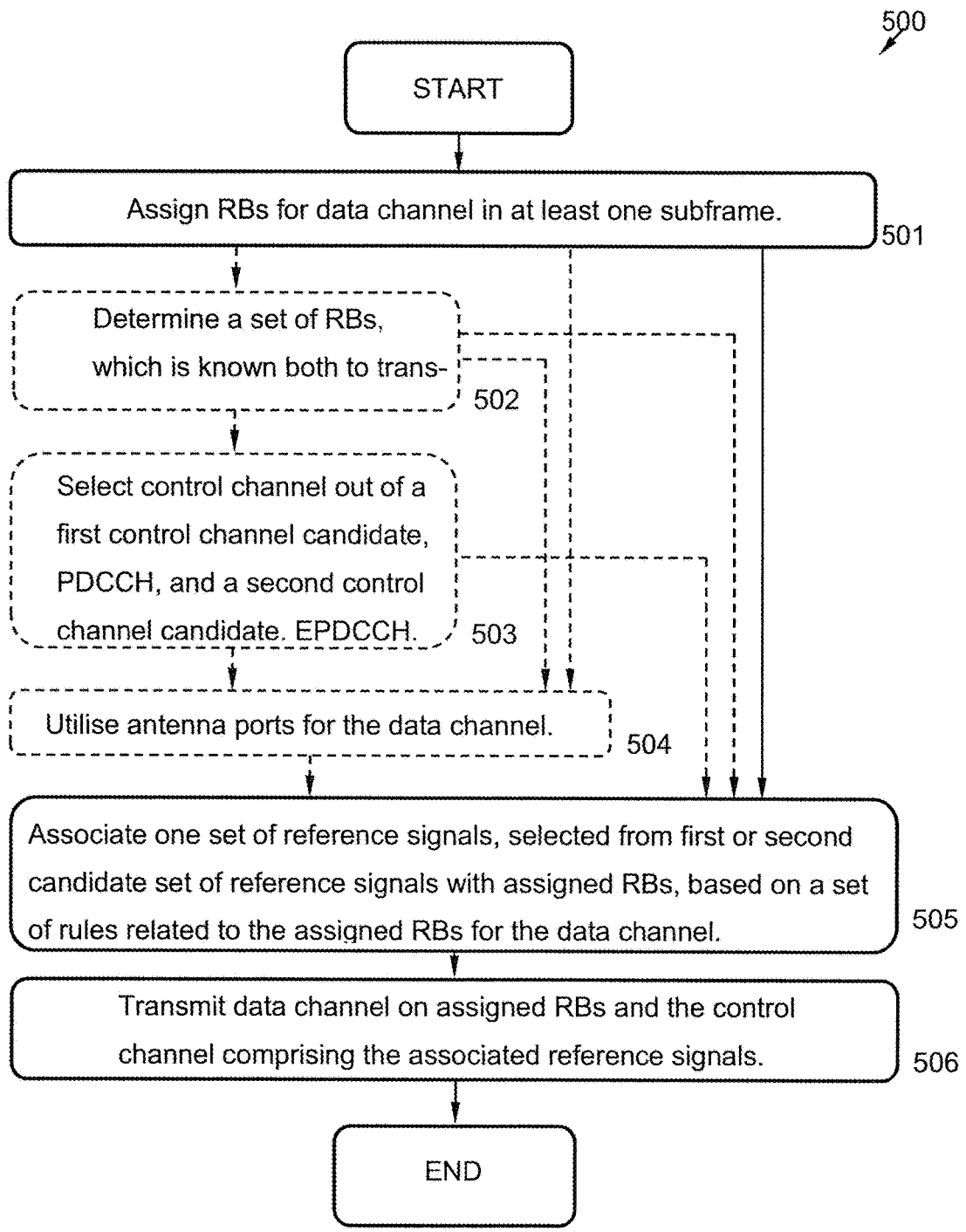
FIG. 5 is a flow chart illustrating a method in a transmitter according to an embodiment of the invention.

FIG. 5 is a flow chart illustrating embodiments of a method 500 in a transmitter 120 for transmission of a data channel to a receiver 110. The transmission comprises using at least one subframe 300, and a set of reference signals. The set of reference signals is selected from a first candidate set of reference signals, and/or from a second candidate set of reference signals, wherein each set of reference signals comprises a set of antenna ports. In some embodiments, the receiver 110 may be provided with an additional set of reference signals, which additionally may be utilised by the receiver 110 for demodulation of the data channel.

The first candidate set of reference signals may comprise cell specific reference signals or receiver specific reference signals. The second candidate set of reference signals may comprise receiver specific reference signals. Further, the cell specific reference signals may comprise Common Reference Signals (CRS). The cell specific reference signals may further comprise time- and/or frequency reduced Common Reference Signals (CRS). Such a reference signal could be characterized by that it uses a subset of the resource elements from the CRS, e.g., it is not transmitted in all subframes 300 or in all resource blocks. The receiver specific reference signals may comprise Demodulation Reference Signal, DM-RS. The receiver-specific reference signals in the first candidate set may comprise punctured Demodulation Reference Signal, DM-RS. A punctured DM-RS signal is characterized by that some of its resource elements are not utilized for the reference signal, e.g., as a consequence of overlapping with resource elements from another channel or signal.

The transmitter 120 and receiver 110 may be comprised in a wireless communication system 100. The receiver 110 may be a User Equipment (UE). The transmitter 120 may be an evolved NodeB (eNodeB). The data channel may be a Physical Downlink Shared Channel (PDSCH). The control channel may be an Enhanced Physical Downlink Control Channel (EPDCCH) or a Physical Downlink Control Channel (PDCCH).

According to some embodiments, the receiver 110 may be provided with two sets of reference signals, which either one may be utilised by the receiver 110 for demodulation of the data channel. For example, the set S may according to previous embodiment, be associated with a punctured DM-RS, while resource blocks 310 outside set S may be associated with a non-punctured DM-RS. The punctured DM-RS would thus be used for the assigned resource blocks 310 according to the rules of previous embodiments. However, the set S may further comprise a cell-specific signal, e.g., a reduced CRS, which may additionally be transmitted for other purposes than to serve as a reference for demodulation. Hence, the embodiment allows improving the demodulation performance by, when the punctured DM-RS is used, to additionally use the cell-specific reference signal as a reference for demodulation. This may require that the transmitter 120 maps the cell-specific antenna port and the user-specific antenna port to the same physical antennas and use the same precoding operation for the antenna ports. Thereby, the receiver 110 can assume that estimation of the channel can equivalently be made from the cell-specific reference signal or the user-specific reference signal. As a result, more resource elements containing reference signals become available which improves the channel estimation performance and thereby the spectral efficiency of the system 100.

To appropriately perform the transmission, the method 500 may comprise a number of actions 501-506.

It is however to be noted that any, some or all of the described actions 501-506, may be performed in a somewhat different chronological order than the enumeration indicates, or even be performed simultaneously. Further, some actions, such as, e.g., the actions 502-504 may be performed only within some embodiments, but not necessarily all embodiments. The method 500 may comprise the following actions:

Action 501

Resource blocks 310 are assigned by means of a control channel for the data channel in the at least one subframe 300. According to some embodiments, the resource blocks 310 may be assigned for the data channel in Resource Block Groups (RBG).

Action 502

This action may be performed in some, but not necessarily all embodiments of the method 500.

A set S of resource blocks 310, which is known both to the transmitter 120 and the receiver 110 is determined.

Action 503

This action may be performed in some, but not necessarily all embodiments of the method 500.

The control channel is selected, where cell-specific antenna ports are associated with a first control channel candidate, PDCCH, and user-specific antenna ports are associated with a second control channel candidate, EPDCCH. The selection may be based on a set of rules related to the assigned 501 resource blocks 310 for the data channel comprising that the receiver 110 is to detect the PDCCH when: all resource blocks 310 comprising the control channel candidate are within the determined 502 set S; the number of resource blocks 310 comprising the control channel candidate within the determined 502 set S exceeds a predetermined threshold value; the lowest indexed resource block 310 comprising the control channel candidate is within the determined 502 set S; the largest indexed resource block 310 comprising the control channel candidate is within the determined 502 set S; and wherein the receiver 110 is to detect the EPDCCH otherwise.

Action 504

This action may be performed in some, but not necessarily all embodiments of the method 500, wherein the control channel has scheduled the data channel in one subframe 300 and reserves time-frequency resources in additional subframes 300 such that subsequent data channel is transmittable without any associated control channel.

Antenna ports may be utilised for the data channel.

According to some embodiments, different antenna ports may be utilised for the data channel, in different subframes 300.

However, according to some embodiments, the same antenna ports may be utilised for the data channel, which are the same as in the subframe 300 comprising the first assignment 501 in the transmission.

Action 505

One set of reference signals, selected from either the first or the second candidate set of reference signals is associated with the assigned 501 resource blocks 310, utilising the set of antenna ports of the selected set of reference signals, based on a set of rules related to at least the assigned 501 resource blocks 310 for the data channel.

The set of rules related to the assigned 501 resource blocks 310 for the data channel may in some embodiments comprise utilising the first candidate set of reference signals when at least one of the following statements is true:

All resource blocks 310 assigned 501 for the data channel are within the determined 502 set S.

The number of resource blocks 310 comprising resource blocks 310 assigned 501 for the data channel within the determined 502 set S exceeds a predetermined threshold value.

The lowest indexed resource block 310 of the assigned 501 resource blocks 310 is within the determined 502 set S.

The largest indexed resource block 310 of the assigned 501 resource blocks 310 is within the determined 502 set S.

Otherwise, the second candidate set of reference signals may be utilised.

Action 506

The data channel is transmitted on the assigned 501 resource blocks 310.

According to some embodiments, wherein the resource blocks 310 have been assigned 501 for the data channel in Resource Block Groups (RBGs), the data channel may be transmitted only in the resource blocks 310 of the RBG for which the same candidate set of reference signals has been determined according to the set of rules related to the assigned 501 resource blocks 310 for the data channel.

According to some embodiments, the data channel may be transmittable in multiple subframes 300 by a single control channel in one subframe 300. In some such embodiments, different antenna ports may be utilised for the data channel in different subframes 300 when the determined 502 set S may be different in the scheduled subframes 300.

According to some embodiments, the data channel may be transmittable in multiple subframes 300 by a single control channel in one subframe 300. In some such embodiments, the same antenna ports may be utilised for the data channel in different subframes 300 when the data channel is either scheduled on resource blocks 310 within the determined 502 set S; or alternatively not scheduled on resource blocks 310 within the determined 502 set S in all subframes 300.

Figure 6:
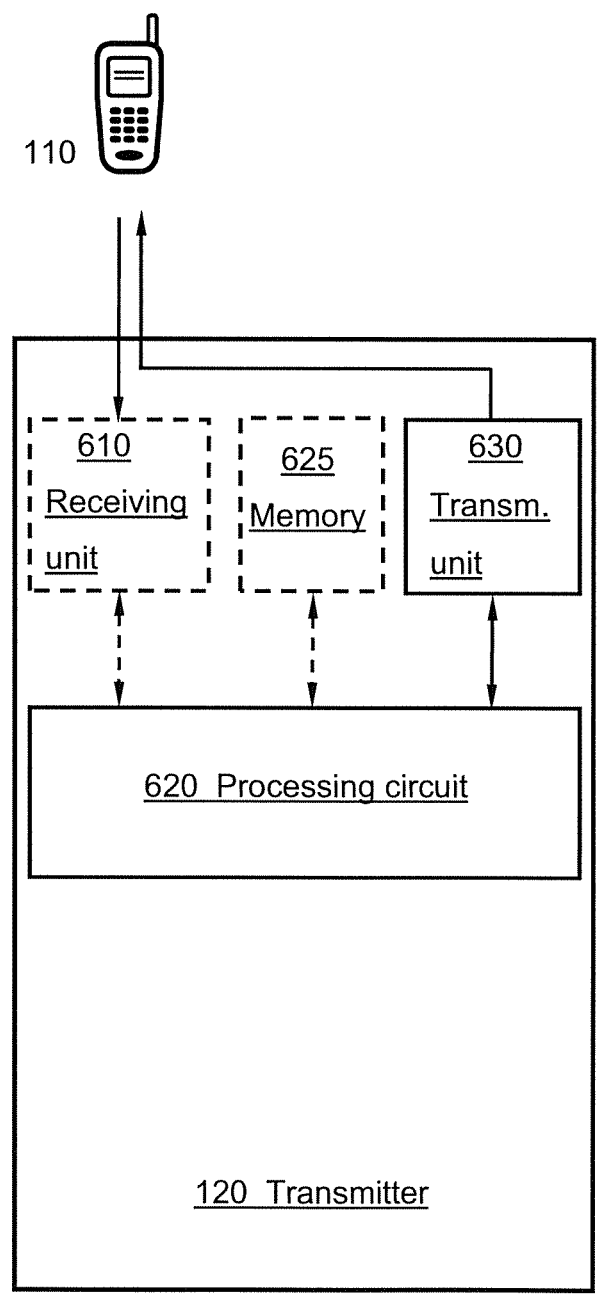
FIG. 6 is a block diagram illustrating a transmitter according to an embodiment of the invention.

FIG. 6 is a block diagram illustrating a transmitter 120 in a wireless communication system 100. The transmitter 120 is configured to perform the different embodiments of the above described method 500 according to any, some or all of the actions 501-506 for transmission of a data channel to a receiver 110.

The transmission is performed by using at least one subframe 300, and a set of reference signals which are selected either from a first candidate set of reference signals, or from a second candidate set of reference signals, each set of reference signals comprising a set of antenna ports.

The first candidate set of reference signals may comprise cell specific reference signals or receiver specific reference signals. The second candidate set of reference signals may comprise receiver specific reference signals. Further, the cell specific reference signals may comprise Common Reference Signals (CRS). The receiver specific reference signals may comprise Demodulation Reference Signal (DM-RS).

The transmitter 120 and receiver 110 may be comprised in a wireless communication system 100. The receiver 110 may be a User Equipment (UE). The transmitter 120 may be an evolved NodeB (eNodeB). The data channel may be a Physical Downlink Shared Channel (PDSCH). The control channel may be an Enhanced Physical Downlink Control Channel (EPDCCH) or a Physical Downlink Control Channel (PDCCH).

According to some embodiments, the receiver 110 may be provided with two sets of reference signals, which either one may be utilised by the receiver 110 for demodulation of the data channel.

For enhanced clarity, any internal electronics or other components of the transmitter 120, not completely indispensable for understanding the herein described embodiments have been omitted from FIG. 6.

The transmitter 120 comprises a processing circuit 620, configured for assigning resource blocks 310 by means of a control channel for the data channel in the at least one subframe 300. The processing circuit 620 is also configured for associating one set of reference signals, selected from either the first or the second candidate set of reference signals with the assigned resource blocks 310, utilising the set of antenna ports of the selected set of reference signals, based on a set of rules related to at least the assigned resource blocks 310 for the data channel.

The processing circuit 620 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The herein utilised expression "processing circuit" may thus represent a processing circuitry comprising a plurality of processing circuits, such as, e.g., any, some or all of the ones enumerated above.

The processing circuit 620 may further perform data processing functions for inputting, outputting, and processing of data comprising data buffering and device control functions, such as call processing control, user interface control, or the like.

Further, the transmitter 120 also comprises a transmitting unit 630, configured for transmitting the data channel on the assigned resource blocks 310.

In addition, according to some embodiments, the transmitter 120 may comprise a receiving unit 610, configured for receiving radio signals over a wireless interface. The radio signals may be received from, e.g., the receiver 110, or any other entity configured for wireless communication according to some embodiments.

Furthermore, the transmitter 120 may comprise at least one memory 625, according to some embodiments. The optional memory 625 may comprise a physical device utilised to store data or programs, i.e., sequences of instructions, on a temporary or permanent basis. According to some embodiments, the memory 625 may comprise integrated circuits comprising silicon-based transistors. Further, the memory 625 may be volatile or non-volatile.

The actions 501-506 to be performed in the transmitter 120 may be implemented through the one or more processing circuits 620 in the transmitter 120, together with computer program product for performing the functions of the actions 501-506. Thus a computer program product, comprising instructions for performing the actions 501-506 in the transmitter 120 may perform transmission of a data channel to the receiver 110 in a wireless communication system 100, when the computer program product is loaded in a processing circuit 620 of the transmitter 120.

The computer program product mentioned above may be provided for instance in the form of a data carrier carrying computer program code for performing at least some of the actions 501-506 according to some embodiments when being loaded into the processing circuit 620. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the transmitter 120 remotely, e.g., over an Internet or an intranet connection.

Figure 7:
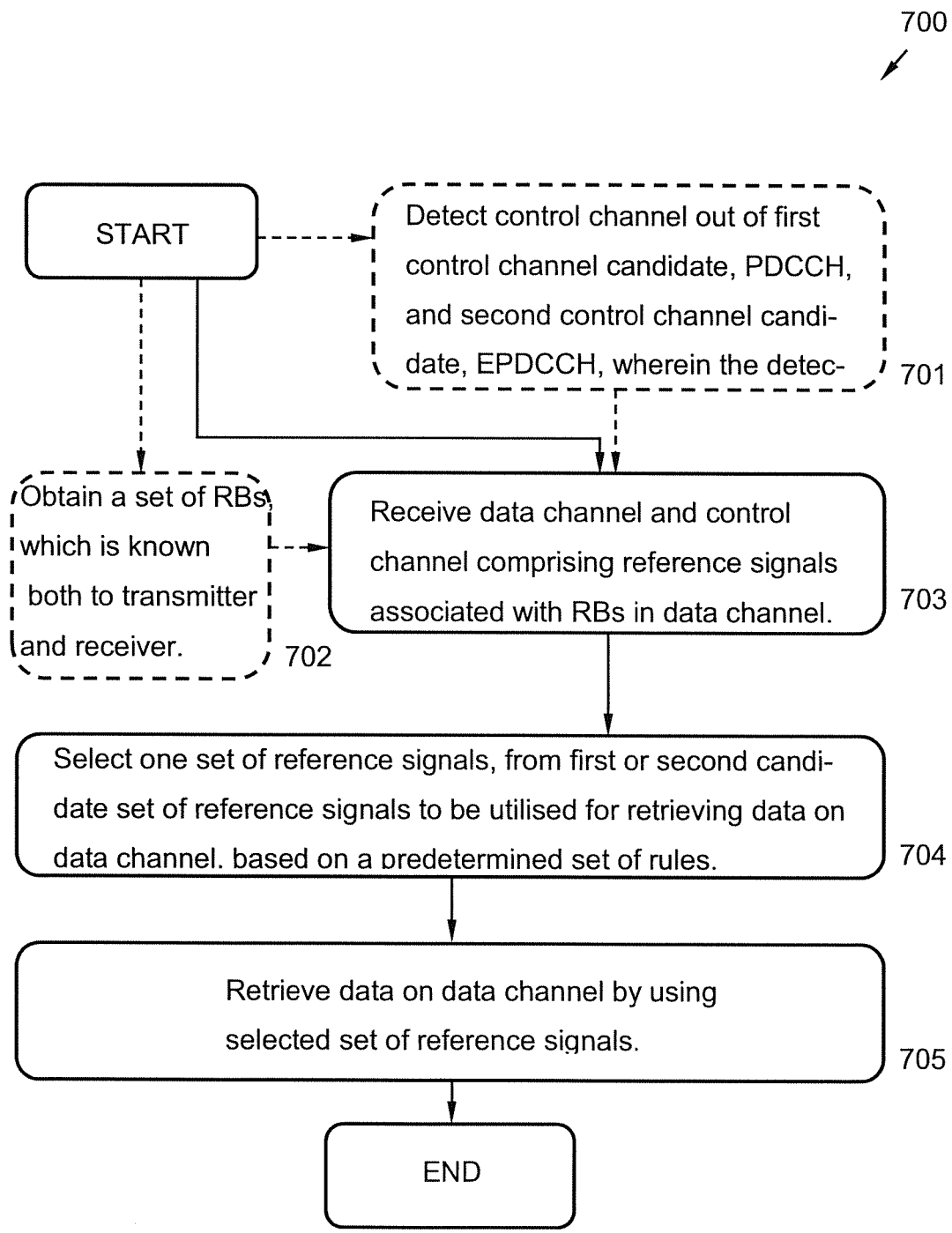
FIG. 7 is a flow chart illustrating a method in a receiver according to an embodiment of the invention.

FIG. 7 is a flow chart illustrating embodiments of a method 700 for use in a receiver 110 in a wireless communication system 100. The method 700 aims at receiving a data channel and a control channel using at least one subframe 300, and at least one set of reference signals which is selected from a first candidate set of reference signals, or from a second candidate set of reference signals. Each set of reference signals comprises a set of antenna ports.

The first candidate set of reference signals may comprise cell specific reference signals or receiver specific reference signals. The second candidate set of reference signals may comprise receiver specific reference signals. Further, the cell specific reference signals may comprise Common Reference Signals (CRS). The receiver specific reference signals may comprise Demodulation Reference Signal, DM-RS.

The transmitter 120 and receiver 110 may be comprised in a wireless communication system 100. The receiver 110 may be a User Equipment (UE). The transmitter 120 may be an evolved NodeB (eNodeB). The data channel may be a Physical Downlink Shared Channel (PDSCH). The control channel may be an Enhanced Physical Downlink Control Channel (EPDCCH) or a Physical Downlink Control Channel (PDCCH).

The control channel may schedule the data channel in one subframe 300 and reserve time-frequency resources in additional subframes 300 such that subsequent data channel may be transmittable without any associated control channel, wherein different antenna ports may be utilised for the data channel in different subframes 300, according to some embodiments.

Further, the control channel may schedule the data channel in one subframe 300 and reserve time-frequency resources in additional subframes 300 such that subsequent data channel is transmittable without any associated control channel, wherein the same set of antenna ports may be utilised for the data channel as in the subframe 300 comprising the first assignment in the transmission.

According to some embodiments, the receiver 110 may receive two sets of reference signals from the transmitter 120, which either one may be utilised by the receiver 110 for demodulation of the received data channel.

To appropriately perform the reception, the method 700 may comprise a number of actions 701-705.

It is however to be noted that any, some or all of the described actions 701-705, may be performed in a somewhat different chronological order than the enumeration indicates, or even be performed simultaneously. Further, some actions, such as, e.g., the actions 701-702 may be performed only within some embodiments, but not necessarily all embodiments. The method 700 may comprise the following actions:

Action 701

This action may be performed in some, but not necessarily all embodiments of the method 700.

A control channel where cell-specific antenna ports are associated with a first control channel candidate (PDCCH) and user-specific antenna ports are associated with a second control channel candidate (EPDCCH) is detected.

The detection may be based on a set of rules comprising detecting the PDCCH when: all resource blocks 310 comprising the control channel candidate are within the obtained set S; and/or the number of resource blocks 310 comprising the control channel candidate within the obtained set S exceeds a predetermined threshold value; and/or the lowest indexed resource block 310 comprising the control channel candidate is within the obtained set S; and/or the largest indexed resource block 310 comprising the control channel candidate is within the obtained set S; and/or wherein the receiver 110 is to detect the EPDCCH otherwise.

Action 702

This action may be performed in some, but not necessarily all embodiments of the method 700.

A set S of resource blocks 310 may be obtained, which may be known both to the transmitter 120 and the receiver 110. The data channel may be transmittable in multiple subframes 300 by a single control channel in one subframe 300 according to some embodiments. Also, different antenna ports may be utilised for the data channel in different subframes 300 when the obtained set S is different in the scheduled subframes 300. Furthermore, the data channel may be transmittable in multiple subframes 300 by a single control channel in one subframe 300, according to some embodiments. Also, furthermore, the same antenna ports may be utilised for the data channel in different subframes 300 when the data channel is either scheduled on resource blocks 310 within the obtained set S; or not scheduled on resource blocks 310 within the obtained set S in all subframes 300.

Action 703

The data channel and the control channel comprising reference signals associated with resource blocks 310 in the data channel is received.

Resource blocks 310 may be received for the data channel in Resource Block Groups (RBG). Further, the data channel may be received only in the resource blocks 310 of the RBG which fulfils the pre-determined set of rules.

Action 704

One set of reference signals is selected from the first or the second candidate set of reference signals; to be utilised for retrieving data on the data channel, based on a predetermined set of rules.

The set of rules utilised for selecting the set of reference signals may comprise utilising a first candidate set of reference signals which may comprise cell specific reference signals or receiver specific reference signals when at least one of the following statements is true:

all received 703 resource blocks 310 of the data channel are within the obtained 702 set S; and/or the received 703 number of resource blocks 310 of the data channel within the obtained 702 set S exceeds a predetermined threshold value; and/or the lowest indexed resource block 310 of the received 703 resource blocks 310 is within the obtained 702 set S and/or the largest indexed resource block 310 of the received 703 resource blocks 310 is within the obtained 702 set S. Otherwise a second candidate set of reference signals which may comprise receiver specific reference signals may be utilised, according to some embodiments.

Action 705

Data is retrieved on the data channel by using the selected 704 set of reference signals.

Figure 8:
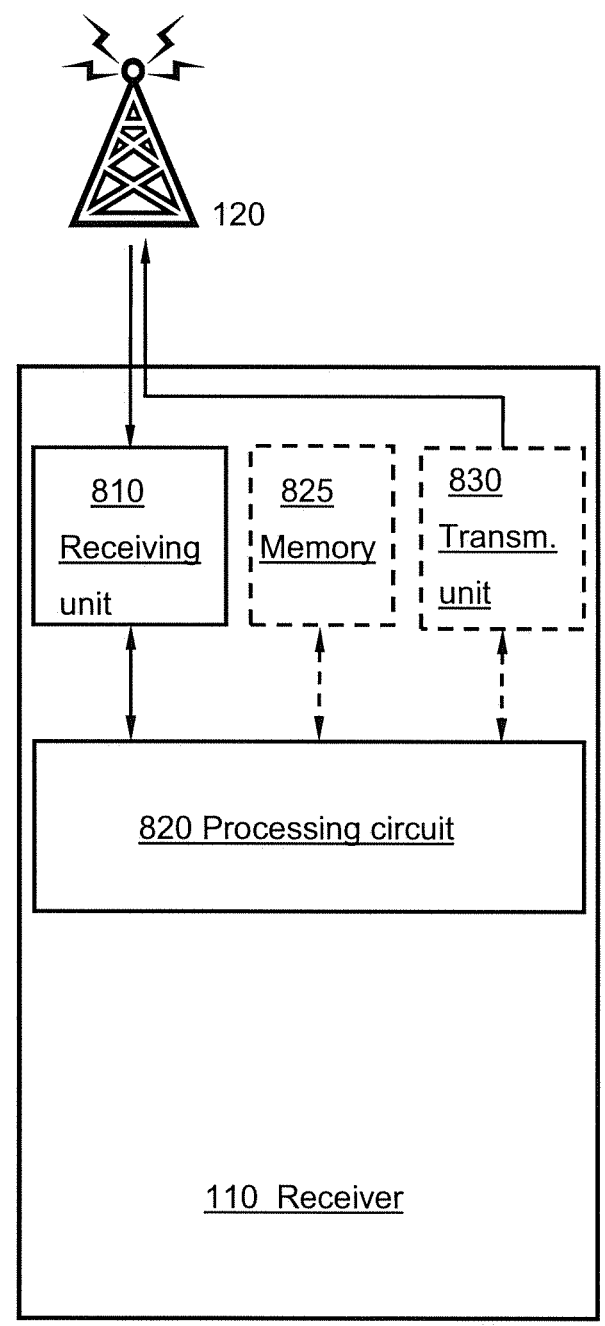
FIG. 8 is a block diagram illustrating a receiver according to an embodiment of the invention.

FIG. 8 is a block diagram illustrating a receiver 110 in a wireless communication system 100. The receiver 110 is configured for receiving a data channel and a control channel using at least one subframe 300, and at least one set of reference signals which is selected from a first candidate set of reference signals, or from a second candidate set of reference signals, each set of reference signals comprising a set of antenna ports.

Thus the receiver 110 is configured for performing the method 700 according to at least some of the actions 701-705.

The wireless communication system 100 may be based on an LTE system. The receiver 110 may be a User Equipment (UE). The transmitter 120 may be an evolved NodeB, eNodeB. The data channel may be a Physical Downlink Shared Channel (PDSCH). The control channel may be an Enhanced Physical Downlink Control Channel (EPDCCH).

For enhanced clarity, any internal electronics or other components of the receiver 110, not completely indispensable for understanding the herein described embodiments has been omitted from FIG. 8.

The receiver 110 comprises a receiving unit 810, configured for receiving the data channel and the control channel comprising reference signals associated with resource blocks 310 in the data channel.

The receiver 110 also comprises a processing circuit 820, configured for selecting one set of reference signals, from the first or the second candidate set of reference signals to be utilised for retrieving data on the data channel, based on a pre-determined set of rules. Further, the processing circuit 820 is also configured for retrieving data on the data channel by using the selected set of reference signals.

The processing circuit 820 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The herein utilised expression "processing circuit" may thus represent a processing circuitry comprising a plurality of processing circuits, such as, e.g., any, some or all of the ones enumerated above.

The processing circuit 820 may further perform data processing functions for inputting, outputting, and processing of data comprising data buffering and device control functions, such as call processing control, user interface control, or the like.

Also, according to some embodiments, the receiver 110 may comprise a transmitting unit 830, configured for transmitting radio signals.

Furthermore, the receiver 110 may comprise at least one memory 825, according to some embodiments. The memory 825 may comprise a physical device utilised to store data or programs, i.e., sequences of instructions, on a temporary or permanent basis. According to some embodiments, the memory 825 may comprise integrated circuits comprising silicon-based transistors. Further, the memory 825 may be volatile or non-volatile.

The actions 701-705 to be performed in the receiver 110 may be implemented through one or more processing circuits 820 in the receiver 110, together with computer program code for performing the functions of at least some of the actions 701-705. Thus a computer program product, comprising instructions for performing the actions 701-705 in the receiver 110 may perform reception of a data channel and a control channel using at least one subframe 300, and at least one set of reference signals which is selected from a first candidate set of reference signals, or from a second candidate set of reference signals, each set of reference signals comprising a set of antenna ports when the computer program product is loaded in a processing circuit 820 of the receiver 110.

The computer program product mentioned above may be provided for instance in the form of a data carrier carrying computer program code for performing at least some of the actions 701-705 according to some embodiments when being loaded into the processing circuit 820. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the receiver 110 remotely, e.g., over an Internet or an intranet connection.

The terminology used in the detailed description of the invention as illustrated in the accompanying drawings is not intended to be limiting of the described methods 500, 700, transmitter 120 and receiver 110, which instead are limited by the enclosed claims.

As used herein, the term "and/or" comprises any and all combinations of one or more of the associated listed items. In addition, the singular forms "a", "an" and "the" are to be interpreted as "at least one", thus also comprising a plurality, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof.

What is claimed is:

1. A method for use in a transmitter for transmission of a data channel to a receiver, using at least one subframe, and at least one set of reference signals which is selected from a first candidate set of reference signals, or from a second candidate set of reference signals, each set of reference signals comprising a set of antenna ports, the method comprising:
    assigning resource blocks by means of a control channel for the data channel in the at least one subframe;
    associating one set of reference signals, selected from the first or the second candidate set of reference signals with the assigned resource blocks, utilizing the set of antenna ports of the selected set of reference signals, based on a set of rules related to at least the assigned resource blocks for the data channel;
    determining for each subframe, a set of resource blocks known both to the transmitter and the receiver; and
    transmitting the data channel on the assigned resource blocks, wherein the data channel is transmittable in multiple subframes by a single control channel in one subframe, and wherein different antenna ports are utilized for the data channel in different subframes when the determined set is different in the scheduled subframes.

2. The method according to claim 1,
    wherein the set of rules related to the assigned resource blocks for the data channel comprises,
        determining whether each of the following statements is true:
        all resource blocks assigned for the data channel are within the determined set, or
        the number of resource blocks comprising resource blocks assigned for the data channel within the determined set exceeds a predetermined threshold value, or
        the lowest indexed resource block of the assigned resource blocks is within the determined set, or
        the largest indexed resource block of the assigned resource blocks is within the determined set; or
        otherwise utilizing the second candidate set of reference signals; and
    utilizing the first candidate set of reference signals when at least one of the statements is true.

3. The method according to claim 1, wherein resource blocks are assigned for the data channel in Resource Block Groups (RBGs), and wherein the data channel is transmitted only in the resource blocks of the RBG for which the same candidate set of reference signals has been determined according to the set of rules related to the assigned resource blocks for the data channel.

4. The method according to claim 2, further comprising:
    selecting the control channel where cell-specific antenna ports are associated with a first control channel candidate (PDCCH) and user-specific antenna ports are associated with a second control channel candidate (EPDCCH) wherein the selection is based on a set of rules related to the control channel comprising,
    the receiver is to detect the PDCCH when:
    all resource blocks comprising the control channel candidate are within the determined set,
    the number of resource blocks comprising the control channel candidate within the determined set exceeds a predetermined threshold value,
    the lowest indexed resource block comprising the control channel candidate is within the determined set, and
    the largest indexed resource block comprising the control channel candidate is within the determined set; and
    otherwise the receiver is to detect the EPDCCH.

5. The method according to claim 1, wherein the first candidate set of reference signals comprises cell specific reference signals or receiver specific reference signals, and wherein the second candidate set of reference signals comprises receiver specific reference signals.

6. The method according to claim 1, further comprising:
    scheduling, by the control channel, the data channel in one subframe and reserving time-frequency resources in additional subframes such that subsequent data channel is transmittable without any associated control channel; and utilizing antenna ports for the data channel, which are different in different subframes.

7. The method according to claim 1, further comprising:
scheduling, by the control channel, the data channel in one subframe and reserving time-frequency resources in additional subframes such that subsequent data channel is transmittable without any associated control channel; and
utilizing antenna ports for the data channel which are the same as in the subframe comprising the first assignment in the transmission.

8. The method according to claim 2, wherein the data channel is a Physical Downlink Shared Channel (PDSCH).

9. The method according to claim 2, wherein the same antenna ports are utilised for the data channel in different subframes when the data channel is either scheduled on resource blocks within the determined set or not scheduled on resource blocks within the determined set in all subframes.

10. The method according to claim 1, further comprising:
providing the receiver with an additional set of reference signals, which additionally may be utilised by the receiver for demodulation of the data channel.

11. The method according to claim 10, wherein the additional set of reference signals comprises cell specific reference signals which may be utilised by the receiver for demodulation of the data channel in addition to the first set of reference signals, comprising receiver specific reference signals.

12. The method according to claim 11, wherein:
the receiver is a User Equipment (UE);
the transmitter is an evolved NodeB (eNodeB);
the data channel is a Physical Downlink Shared Channel (PDSCH);
the control channel is either an Enhanced Physical Downlink Control Channel (EPDCCH) or a Physical Downlink Control Channel (PDCCH);
the cell specific reference signals comprise:
a Common Reference Signal (CRS), and/or
a time- and/or frequency reduced CRS; and
the receiver specific reference signals comprise:
a Demodulation Reference Signal (DM-RS), and/or
a time- and/or frequency reduced DM-RS.

13. A transmitter for transmitting a data channel to a receiver, using at least one subframe, and at least one set of reference signals which is selected from a first candidate set of reference signals, or from a second candidate set of reference signals, each set of reference signals comprising a set of antenna ports, the transmitter comprising:
a processing circuit, configured for
assigning resource blocks by means of a control channel for the data channel in the at least one subframe,
associating one set of reference signals, selected from the first or the second candidate set of reference signals with the assigned resource blocks, utilizing the set of antenna ports of the selected set of reference signals, based on a set of rules related to at least the assigned resource blocks for the data channel, and
determining for each subframe, a set of resource blocks known both to the transmitter and the receiver; and
a transmitting unit, configured for transmitting the data channel on the assigned resource blocks, wherein the data channel is transmittable in multiple subframes by a single control channel in one subframe, and wherein different antenna ports are utilized for the data channel in different subframes when the determined set is different in the scheduled subframes.

14. A method for use in a receiver, for reception of a data channel and a control channel using at least one subframe, and at least one set of reference signals which is selected from a first candidate set of reference signals, or from a second candidate set of reference signals, each set of reference signals comprising a set of antenna ports, the method comprising:
receiving the data channel and the control channel comprising reference signals associated with resource blocks in the data channel;
obtaining a set of resource blocks, which is known both to the transmitter and the receiver;
selecting one set of reference signals, from the first or the second candidate set of reference signals to be utilised for retrieving data on the data channel, based on a predetermined set of rules;
retrieving data on the data channel by using the selected set of reference signals;
detecting control channel where cell-specific antenna ports are associated with a first control channel candidate (PDCCH) and user-specific antenna ports are associated with a second control channel candidate (EPDCCH) wherein the detection is based on a set of rules comprising,
detecting the PDCCH when:
all resource blocks comprising the control channel candidate are within the obtained set,
a number of resource blocks comprising the control channel candidate within the obtained set exceeds a predetermined threshold value,
a lowest indexed resource block comprising the control channel candidate is within the obtained set, and
a largest indexed resource block comprising the control channel candidate is within the obtained set; or
otherwise detecting the EPDCCH.

15. The method according to claim 14,
wherein the set of rules utilised for selecting the set of reference signals comprises,
utilizing a cell specific reference signal when at least one of the following statements is true:
all received resource blocks of the data channel are within the obtained set, or
the received number of resource blocks of the data channel within the obtained set exceeds a predetermined threshold value, or
the lowest indexed resource block of the received resource blocks is within the obtained set, or
the largest indexed resource block of the received resource blocks is within the obtained set; or
otherwise utilizing a receiver specific reference signal.

16. The method according to claim 14, wherein resource blocks are received for the data channel in Resource Block Groups (RBGs), and wherein the data channel is received only in the resource blocks of the RBG which fulfils the pre-determined set of rules.

17. The method according to claim 14,
wherein the data channel is a Physical Downlink Shared Channel (PDSCH).

18. The method according to claim 14, wherein the first candidate set of reference signals comprises cell specific reference signals or receiver specific reference signals, and wherein the second candidate set of reference signals comprises receiver specific reference signals.

19. The method according to claim 14, further comprising:
    scheduling, by the control channel, the data channel in one subframe and reserving time-frequency resources in additional subframes such that subsequent data channel is transmittable without any associated control channel, wherein different antenna ports are utilised for the data channel in different subframes.

20. The method according to claim 14, further comprising:
    scheduling, by the control channel, the data channel in one subframe and reserving time-frequency resources in additional subframes such that subsequent data channel is transmittable without any associated control channel, wherein the same set of antenna ports is utilised for the data channel as in the subframe comprising the first assignment in the transmission.

21. The method according to claim 14, wherein the data channel is transmittable in multiple subframes by a single control channel in one subframe, and wherein different antenna ports are utilised for the data channel in different subframes when the obtained set is different in the scheduled subframes.

22. The method according to claim 14, wherein the data channel is transmittable in multiple subframes by a single control channel in one subframe, and wherein the same antenna ports are utilised for the data channel in different subframes when the data channel is either scheduled on resource blocks within the obtained set; or not scheduled on resource blocks within the obtained set in all subframes.

23. A receiver for receiving a data channel and a control channel using at least one subframe, and at least one set of reference signals which is selected from a first candidate set of reference signals, or from a second candidate set of reference signals, each set of reference signals comprising a set of antenna ports, the receiver comprising:
    a receiving unit, configured for receiving the data channel and the control channel comprising reference signals associated with resource blocks in the data channel; and
    a processing circuit, configured for:
        obtaining a set of resource blocks, which is known both to the transmitter and the receiver,
        selecting one set of reference signals, from the first or the second candidate set of reference signals to be utilised for retrieving data on the data channel, based on a pre-determined set of rules;
        retrieving data on the data channel by using the selected set of reference signals; detecting control channel where cell-specific antenna ports are associated with a first control channel candidate (PDCCH) and user-specific antenna ports are associated with a second control channel candidate (EPDCCH) wherein the detection is based on a set of rules comprising,
    detecting the PDCCH when:
    all resource blocks comprising the control channel candidate are within the obtained set,
    a number of resource blocks comprising the control channel candidate within the obtained set exceeds a predetermined threshold value,
    a lowest indexed resource block comprising the control channel candidate is within the obtained set, and
    a largest indexed resource block comprising the control channel candidate is within the obtained set; or
    otherwise detecting the EPDCCH.

* * * * *